US012736065B1

(12) United States Patent
Witten

(10) Patent No.: US 12,736,065 B1
(45) Date of Patent: Sep. 15, 2026

(54) COMPACT SPEED-INCREASING THRUST MODULE FOR HORIZONTAL PUMP SYSTEMS

(71) Applicant: MINGO MANUFACTURING INCORPORATED, Owasso, OK (US)

(72) Inventor: Raymond Lee Witten, Owasso, OK (US)

(73) Assignee: MINGO MANUFACTURING INCORPORATED, Owasso, OK (US)

( * ) Notice: Subject to any disclaimer, the term of this patent is extended or adjusted under 35 U.S.C. 154(b) by 0 days.

(21) Appl. No.: 19/305,398

(22) Filed: Aug. 20, 2025

(51) Int. Cl.
*F04D 29/58* (2006.01)
*F04D 13/02* (2006.01)
*F16H 57/02* (2012.01)
*F16H 57/04* (2010.01)

(52) U.S. Cl.
CPC ......... *F04D 29/5806* (2013.01); *F04D 13/02* (2013.01); *F16H 57/0415* (2013.01); *F16H 57/0441* (2013.01); *F16H 57/0471* (2013.01); *F16H 2057/02069* (2013.01)

(58) Field of Classification Search
CPC .. F04D 13/02; F04D 29/5806; F16H 57/0415; F16H 57/0416; F16H 57/0441; F16H 57/0471
See application file for complete search history.

(56) References Cited

U.S. PATENT DOCUMENTS 5,667,314 A 9/1997 Limanowka et al.
6,450,782 B1 * 9/2002 Sakamoto ............... F04C 23/00 248/678
7,104,766 B2 9/2006 Mascola
7,326,034 B2 2/2008 Sheth et al.
8,246,251 B1 8/2012 Gardner
9,366,240 B2 * 6/2016 Horley .................... F04D 29/22
11,092,164 B2 * 8/2021 Nelson .................. F04D 29/628
11,125,218 B2 * 9/2021 Botting ..................... F04D 1/06
11,199,179 B2 * 12/2021 Watson ..................... F03G 3/08
11,493,049 B2 * 11/2022 Tiller .................... F04D 29/043
11,629,720 B2 4/2023 Bierig et al.
11,835,124 B2 * 12/2023 Dsouza ............... F16H 57/0416
2006/0269178 A1 * 11/2006 Mascola ................ F01C 21/02 384/107

(Continued)

FOREIGN PATENT DOCUMENTS

CH 187201 A * 10/1936 ......... F16H 57/0412
CN 107084141 A * 8/2017 ........... F04D 29/563
CN 115507040 A * 12/2022 ......... F04D 29/5806

(Continued)

OTHER PUBLICATIONS

Machine translation of JP 7206083 B2 obtained on Mar. 16, 2026.*

*Primary Examiner* — Adam D Rogers
(74) *Attorney, Agent, or Firm* — Dennis D. Brown; Brown Patent Law, P.L.L.C.

(57) ABSTRACT

A compact, speed-increasing thrust module which (i) installs as a unit in a horizontal pump system to replace the standard thrust chamber which would otherwise be used, (ii) allows the horizontal pump system to operate at an optimum speed outside of the pump motor rating, (iii) reduces the number of pump stages required, (iv) thereby reduces the overall size, weight and cost of the system, (v) reduces complexity, and (vi) reduces the time and costs for installation, leveling and component alignment.

7 Claims, 1 Drawing Sheet

(56) References Cited

U.S. PATENT DOCUMENTS

2020/0158125 A1 5/2020 Thomas et al.

FOREIGN PATENT DOCUMENTS

| | | | | |
|---|---|---|---|---|
| EP | 0877165 A2 * | 11/1998 | ............ F04C 11/001 |
| GB | 1587946 A * | 4/1981 | ........... F04D 29/605 |
| JP | 7206083 B2 * | 1/2023 | ............. F03D 3/005 |
| RU | 171446 U1 * | 6/2017 | |
| RU | 176375 U1 * | 1/2018 | |

* cited by examiner

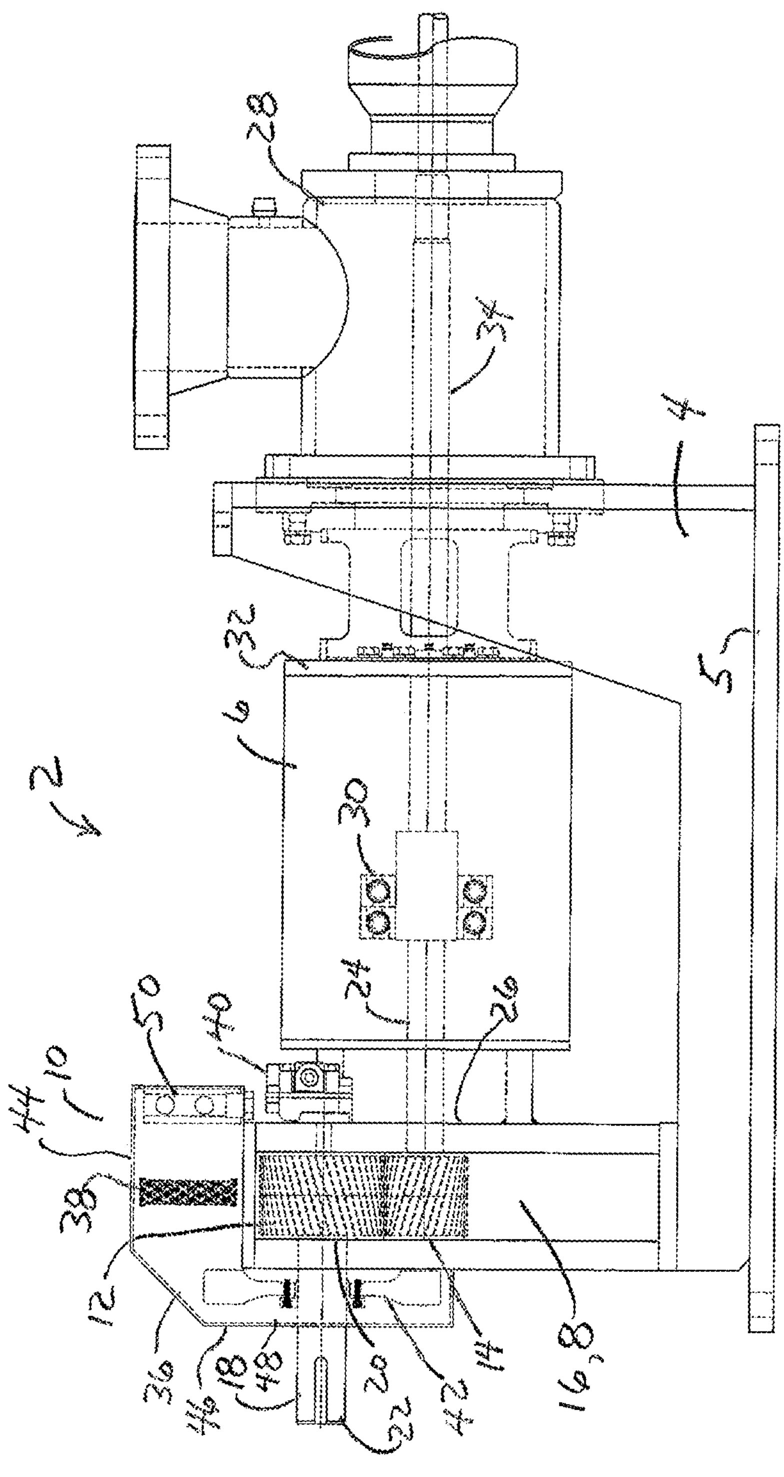
2
4
5
6
8
10
12
14
16
18
20
22
24
26
28
30
32
34
36
38
40
42
44
46
48
50

COMPACT SPEED-INCREASING THRUST MODULE FOR HORIZONTAL PUMP SYSTEMS

FIELD OF THE INVENTION

The present invention relates to horizontal pump systems, and to thrust chamber systems and methods therefor.

BACKGROUND OF THE INVENTION

Multistage submersible pumps are commonly used in vertical wells for recovering oil or other well fluids. Such pumps typically comprise (i) a series of impeller elements mounted on an elongate rotating shaft, (ii) a fluid intake which is located below the lowermost impeller element, and (iii) a fluid discharge which is located at the upper end of the pump.

Because of their ability to (1) pump large amounts of fluid at generally any desired pressure and (2) operate with equal efficiency when mounted horizontally, submersible pumps are also mounted horizontally for above-ground use as horizontal flood water pumps, as horizontal pipeline booster pumps, as horizontal pumps for saltwater disposal, and as horizontal pumps for other purposes.

When used in such above-ground services, either on land or offshore, the submersible pump will typically be horizontally-mounted in or on a frame, skid, or other support structure along with an electric motor or combustion engine which is linked to the rotating shaft of the horizontally-mounted pump. In addition, the drive train between the motor or engine and the horizontally-mounted pump will also include at least a thrust chamber for protecting the motor or engine from the axial thrust forces which act upon the rotating shaft of the pump during operation.

By way of example, but not by way of limitation, the axial thrust exerted on the rotating shaft of a horizontal pump system can be the result of: the net axial impeller force produced by the pump impellers; special axial forces such as increased axial impeller forces produced during start-up; fluid momentum in the pump; or resultant pressure forces arising from static pressures upstream and downstream of the shaft seal.

Because of these forces, the thrust chamber is critical for the operation of the horizontal pump system. The thrust bearings in the thrust chamber absorb the axial thrust loads generated by the pump and the thrust chamber transfers torque away from the motor to the pump barrel. The thrust chamber also prevents the shaft from moving too far in either direction, and further prevents the mechanical seal of the pump system from leaking.

Each multistage horizontal pump has a pump curve for the pump stages which indicates the optimum speed of the pump for peak operating efficiency. The greater the operating efficiency of the multistage pump, the fewer pumping stages that will be required for a given application. Consequently, by increasing its efficiency and reducing the number of pump stages, it is theoretically possible to reduce the length and the footprint of the horizontal pumping system—thereby reducing the manufacturing and shipping costs of the system, and also reducing the amount of valuable space used by the horizontal pumping system at the pumping site.

Unfortunately, however, the use of a motor or engine having a high rating sufficient for directly operating the horizontal pump at optimum speed increases the cost and the size of the motor, thereby significantly offsetting the benefits achieved by reducing the number of pump stages.

Moreover, any improvements in efficiency which might otherwise be provided by alternative means, such as, e.g., adding additional components to the drive train of the horizontal pumping system, would also be offset by (i) the increased size and cost of the drive train and the skid for the pumping system due to the additional components, (ii) the added time, expense, and complexity of leveling and aligning the longer chain of components of the horizontal pumping system, and (iii) the need to use additional anchors for installing the elongated system.

Consequently, a need exists for a device and method for improving the efficiency, mechanics, and operation of a horizontal pumping system so that the improved horizontal pumping system will (i) operate at a higher speed to provide optimum efficiency and reduce the number of pumping stages required for a given application, (ii) allow the horizontal pump stages to operate at an optimum speed which is outside of the rating of the motor or engine, (iii) reduce the overall weight, length, and footprint of the horizontal pumping system and skid, and (v) reduce the complexity, time, and cost of installing, anchoring, leveling, and aligning the entire chain of components of the horizontal pumping system.

SUMMARY OF THE INVENTION

The present invention provides a speed-increasing thrust module which installs as a single unit in a horizontal pump system. The inventive speed-increasing thrust module replaces, and is not significantly larger than, the standard thrust chamber which would typically be used in the horizontal pump system. The compact speed-increasing thrust module, and the method of installing and using the compact module, alleviate the problems and satisfy the needs discussed above.

In one aspect, the speed-increasing thrust module preferably comprises: (i) a module support bracket, plate, or frame; (ii) a thrust compartment provided on or in the module support bracket, plate, or frame; (iii) a speed-increasing gear compartment provided on or in the module support bracket, plate, or frame; (iv) a first gear in the speed-increasing gear compartment which is driven by an input shaft; (v) a speed-increasing gear in the speed-increasing gear compartment which is driven by the first gear, the speed-increasing gear having an outer diameter which is less than the outer diameter of the first gear; and (vi) an output shaft which is driven by the speed-increasing gear and extends through one or more thrust bearings in the thrust compartment.

The compact, inventive speed-increasing thrust module (a) replaces, and is not significantly larger than, the standard thrust chamber of the horizontal pump system, (b) absorbs all axial thrust loads as needed, and (c) allows the improved horizontal pump system to operate at an optimum speed which is outside of the rating of the pump motor or engine.

Consequently, the inventive speed-increasing thrust module (i) reduces the number of pump stages needed for a given application without requiring the use of a larger, more costly motor or engine with a higher rating and (ii) also reduces the overall length, weight, and footprint of the horizontal pump system. In addition, because the inventive speed-increasing thrust module is a prefabricated and pre-calibrated module which is installed in the horizontal pump system as a single unit, the inventive module reduces the overall complexity of the system and reduces the time and cost which would otherwise be required for installing, anchoring, leveling, and aligning the entire string of components of the pump system.

Further aspects, features, and advantages of the present invention will be apparent to those in the art upon examining the accompanying drawings and upon reading the following Detailed Description of the Preferred Embodiments.

BRIEF DESCRIPTION OF THE DRAWING

FIG. 1 schematically illustrates an embodiment 2 of the compact, speed-increasing thrust module provided by the present invention.

DETAILED DESCRIPTION OF THE PREFERRED EMBODIMENTS

An embodiment 2 of the compact speed-increasing thrust module provided by the present invention is schematically illustrated in FIG. 1. The inventive speed-increasing thrust module 2 preferably comprises: a module support bracket, frame, or plate 4 (shown, e.g., in FIG. 1 as a support bracket 4 on a base plate 5); a thrust chamber compartment 6 which is held in or on the support bracket, frame, or plate 4; a speed-increasing gear compartment 8 which is held in or on the support bracket, frame, or plate 4; and a lubricant cooling system 10 for cooling oil or other lubricant which is used in the thrust compartment 6.

The speed-increasing gear compartment 8 of the inventive module 2 comprises a first gear 12 and a meshing speed-increasing gear 14 which are rotatably mounted in the interior 16 of the gear compartment 8. The interior 16 of the speed-increasing gear compartment 8 is preferably isolated from the thrust compartment 6.

The first gear 12 is driven by an input shaft 18 having (i) an end 20 which extends into the speed-increasing gear compartment 8 and (ii) an opposite end 22 which is coupled or otherwise linked to and driven by the drive shaft of the motor or engine (not shown) of the horizontal pump system. The first gear 12 in turn drives the speed-increasing gear 14, which operably meshes with the first gear 12. The speed-increasing gear 14 then drives an output shaft 24 which extends through an outer (forward) wall 26 of the gear compartment 8 and into the thrust compartment 6.

The outer diameter of the speed-increasing gear 14 in the speed-increasing gear compartment 8 is less than the outer diameter of the first gear 12 so that the rotating speed of the output shaft 24 driven by the speed-increasing gear 14 is greater than the rotating speed of the input shaft 18 which drives the first gear 12. The gear ratio (i.e., the diameter ratio) of the speed-increasing gear 14 to the first gear 12 is customizable for increasing the speed of the output shaft 24 to correspond to the optimum speed of the particular horizontal pump 28 which is driven by the output shaft 24.

In addition, the motor or engine which is used in the horizontal pump system to drive the input shaft 18 will preferably be a variable speed motor or engine which can be used to further adjust the resulting speed of the output shaft 24 as may be needed in order to more closely or more precisely match the optimum speed of the horizontal pump 28.

By way of example, but not by way of limitation, the first gear 12 and speed-increasing gear 14 used in the speed-increasing gear compartment 8 can be spur or helical gears. For noise reduction purposes, the first gear 12 and speed-increasing gear 14 will more preferably be helical gears.

The drive motor or engine used the horizontal pump system can generally be any desired type of motor or engine which is sufficiently sized to drive the pump 28. The motor or engine will typically be an electric motor. Examples of suitable couplings for linking the drive shaft of the motor or engine to the input shaft 18 of the inventive speed-increasing thrust module 2 include, but are limited to, standard spacer couplings, such as those available from Rexnord Thomas and other manufactures.

The output shaft 24 of the inventive speed-increasing thrust module 2 extends from the speed-increasing gear compartment 8 through one or more thrust bearings 30 in the thrust compartment 6. The one or more thrust bearings 30 can be generally any type of thrust bearings which are effective for protecting the motor or engine and other drive chain components from the axial thrust forces transmitted by the rotating shaft 34 of the horizontal pump 28. The one or more thrust bearings 30 will preferably be angular contact ball bearings or tilt pad thrust bearings.

The one or more thrust bearings 30 is/are preferably mounted and operate in the thrust compartment 6 of the inventive module 2 in the same manner as such bearings would be mounted and would operate in a typical prior art thrust chamber.

The output shaft 24 of the inventive speed-increasing module 2 extends through an outer (forward) wall 32 of the thrust compartment 6 and is coupled to the shaft 34 of the horizontal pump 28 for driving the pump 28. Examples of suitable couplings for linking the output shaft 24 of the inventive speed-increasing thrust module 2 to the rotating shaft 34 of the horizontal pump 28 include, but are not limited to, standard shaft-to-shaft spline couplers.

The lubricant used in the thrust compartment 6 of the inventive module 2 can be oil or generally any other type of lubricant used in prior art thrust chambers. The lubrication method used in the thrust compartment 6 will preferably be either splash lubrication or flooded lubrication with forced circulation. Most preferably, the lubrication system used in the thrust compartment 6 of the inventive speed-increasing thrust module 2 will be a flooded lubrication system with forced circulation.

The lubricant cooling system 10 used in the compact speed-increasing thrust module 2 preferably comprises: a cooling system housing 36 which is external to the thrust compartment 6 and the speed-increasing gear compartment 8; a radiator or other heat exchange element 38; a pump 40 which circulates the lubricant from the thrust compartment 6 through the heat exchange element 38; and a fan 42 which blows cooling air through the heat exchange element 38 to cool the lubricant. By way of example, but not by way of limitation, the lubricant cooling system pump 40 is preferably a gear pump with a flow rate of not more than five gallons per minute.

The fan 42 of the lubricant cooling system 10 is preferably an axial fan which is mounted on and rotated by the input shaft 18 of the inventive module 2. The cooling system housing 36 comprises (i) an upper section 44 which is positioned on top of the speed-increasing gear compartment 8 and houses the heat exchange element 38 and (ii) a rearward section 46 which extends downwardly, from the upper section 44, on the rearward side of the speed-increasing gear compartment 8 and houses the fan 42. The cooling system housing 36 further includes (a) air intake openings in the back wall 48 of the rearward section 46 of the housing 36 around the input shaft 18 and (b) air discharge openings 50 positioned in the upper section 44 of the housing 36, downstream of the heat exchange element 38, which discharge the heated air away from the pumping system equipment.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within the invention as defined by the claims.

What is claimed is:

1. A speed-increasing thrust module which installs as a unit in a horizontal pump system, the speed-increasing thrust module comprising:

- a module support bracket, plate, or frame;
- a thrust compartment provided on or in the module support bracket, plate, or frame;
- a speed-increasing gear compartment provided on or in the module support bracket, plate, or frame;
- a first gear in the speed-increasing gear compartment which is driven by an input shaft;
- a speed-increasing gear in the speed-increasing gear compartment which is driven by the first gear, the speed-increasing gear having an outer diameter which is less than an outer diameter of the first gear;
- an output shaft which is driven by the speed-increasing gear and extends through one or more thrust bearings in the thrust compartment;
- a lubricant in the thrust compartment; and
- a lubricant cooling system comprising
  - a heat exchange element,
  - a pump which circulates the lubricant through the heat exchange element,
  - a fan which blows air through the heat exchange element to cool the lubricant, and
  - the fan being mounted on the input shaft.

2. The speed-increasing thrust module of claim 1 further comprising:

- the lubricant cooling system including a cooling system housing which is external to the speed-increasing gear compartment and the thrust compartment and
- the heat exchange element and the fan being positioned in the cooling system housing.

3. The speed-increasing thrust module of claim 2 further comprising the cooling system housing being mounted on the speed-increasing gear compartment.

4. The speed-increasing thrust module of claim 1 further comprising the pump being a gear pump with a flow rate of not more than five gallons per minute.

5. The speed-increasing thrust module of claim 1 further comprising the fan being a radial fan.

6. The speed-increasing thrust module of claim 1 further comprising the first gear and the speed-increasing gear being helical gears.

7. The speed-increasing thrust module of claim 1 further comprising the one or more thrust bearings being one or more angular contact ball bearings or one or more tilt pad thrust bearings.

* * * * *